United States Patent [19]

Woodbury

[11] Patent Number: 4,852,780
[45] Date of Patent: Aug. 1, 1989

[54] GUN RACK

[76] Inventor: Wayne F. Woodbury, P.O. Box 1154, Delta Junction, Ak. 99737

[21] Appl. No.: 230,361

[22] Filed: Aug. 10, 1988

[51] Int. Cl.$^4$ .............................................. B60R 11/00
[52] U.S. Cl. ........................ 224/42.45 R; 224/42.42; 224/913; 211/64
[58] Field of Search ................ 224/913, 39, 42.45 R, 224/42.42, 42.33, 311; 211/64, 60.1, 208, 70.8; 248/205.2

[56] References Cited

U.S. PATENT DOCUMENTS

| | | |
|---|---|---|
| 2,668,645 | 2/1954 | Pease . |
| 2,775,351 | 12/1956 | Johnson et al. . |
| 2,854,147 | 9/1958 | Derr ................... 211/70.8 |
| 2,919,058 | 12/1959 | Thompson . |
| 3,477,586 | 11/1969 | Haluska . |
| 3,685,708 | 8/1972 | Herrington ........... 224/42.45 R |
| 3,746,177 | 7/1973 | Vilotti . |
| 3,917,071 | 11/1975 | Walters ................ 211/64 |
| 4,131,202 | 12/1978 | Hansen ................ 224/913 |
| 4,132,315 | 1/1979 | Young ................. 211/64 |
| 4,579,263 | 4/1986 | Ehmke et al. ........ 224/42.45 R |
| 4,796,762 | 1/1989 | Caw ................... 211/89 |

FOREIGN PATENT DOCUMENTS 167805 3/1951 Fed. Rep. of Germany ... 248/200.1

Primary Examiner—Linda J. Sholl
Attorney, Agent, or Firm—Jerry T. Kearns

[57] ABSTRACT

A portable gun rack for use in vehicles having front bucket seats has an elongated rectangular barrel support block perpendicularly attached at a top end of an elongated strut. The block has a plurality of U-shaped notches for the reception of gun barrels. A back side wall of the block has a VELCRO fastener for cooperation with a VELCRO fastener provided on the dashboard of the vehicle. A gun butt support box is perpendicularly attached at the lower end of the strut and is dimensioned to be received between the bucket seats and rest on the vehicle floor. A triangular rubber block may be provided on a bottom surface of the box. Gun barrels are retained in the U-shaped notches by a VELCRO fastened strap. The strut may be telescopically adjusted in length to adapt for use in different vehicles and with various different guns.

12 Claims, 3 Drawing Sheets

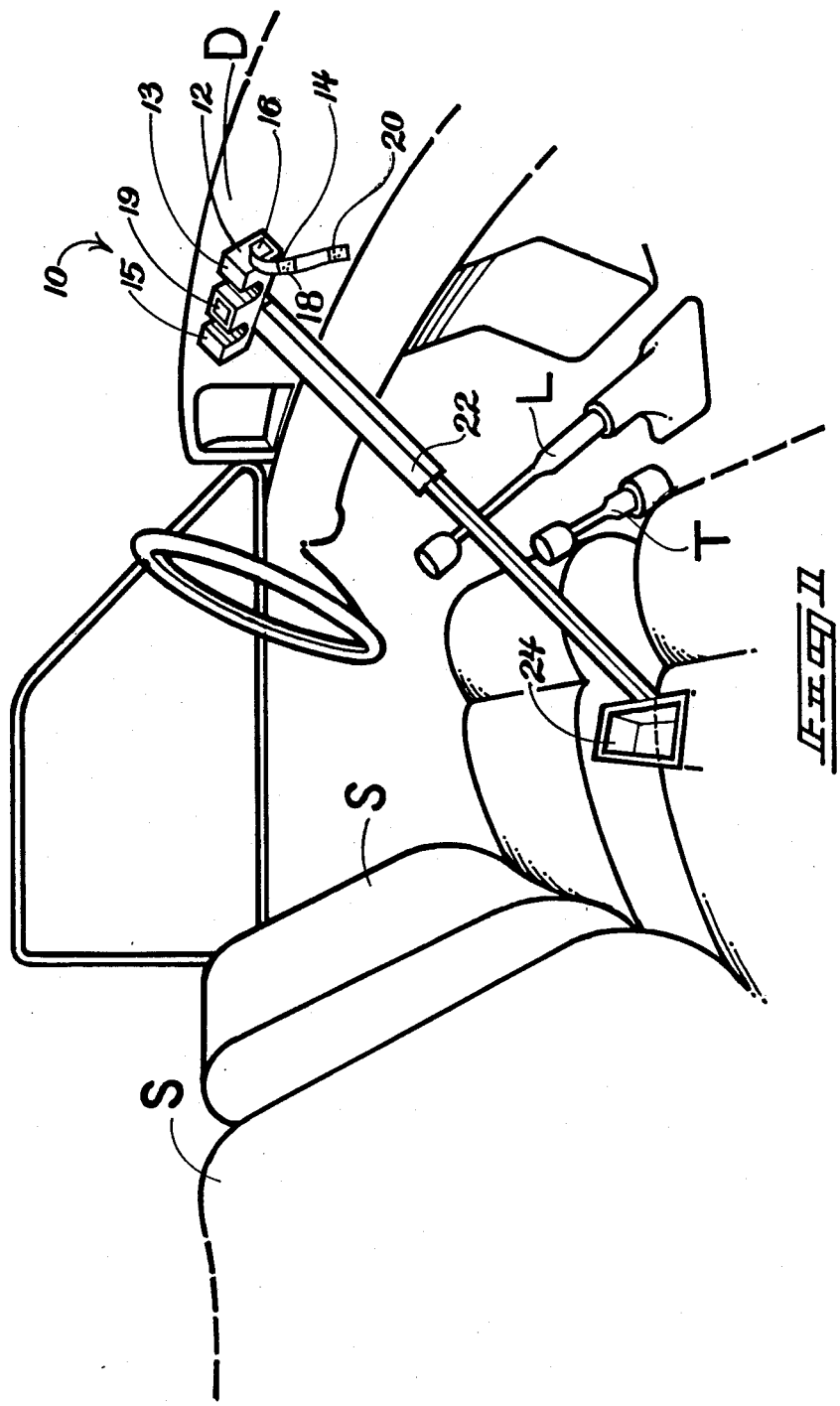

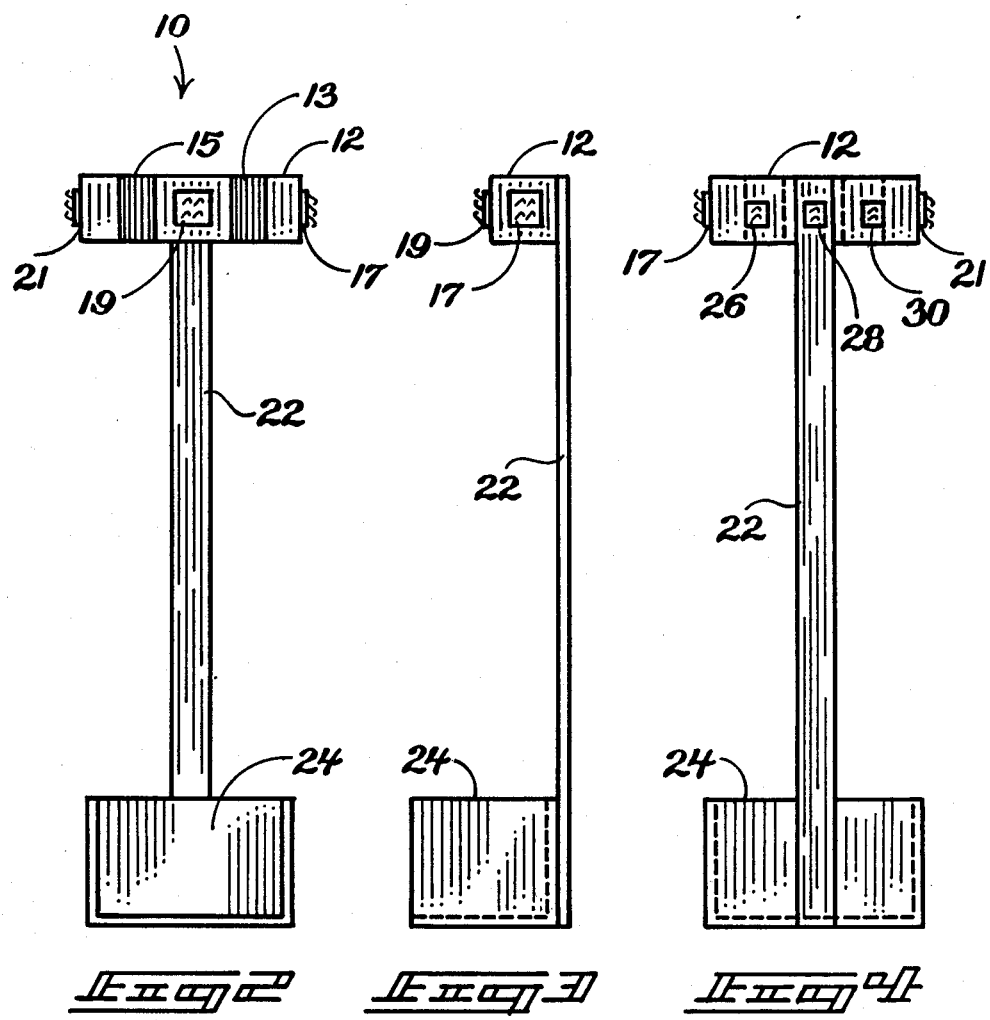
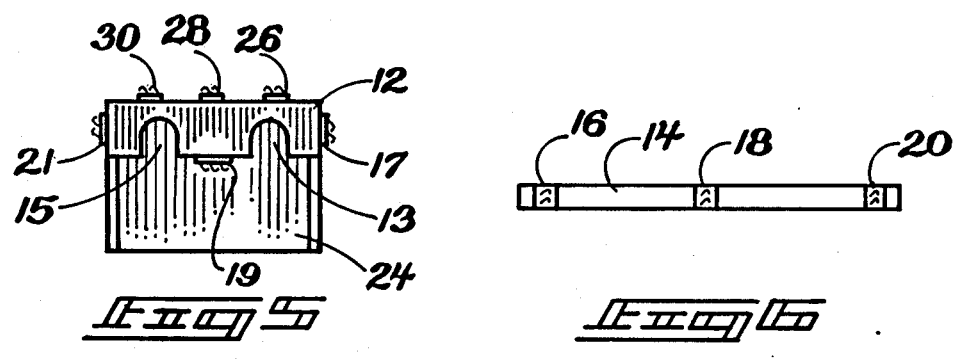

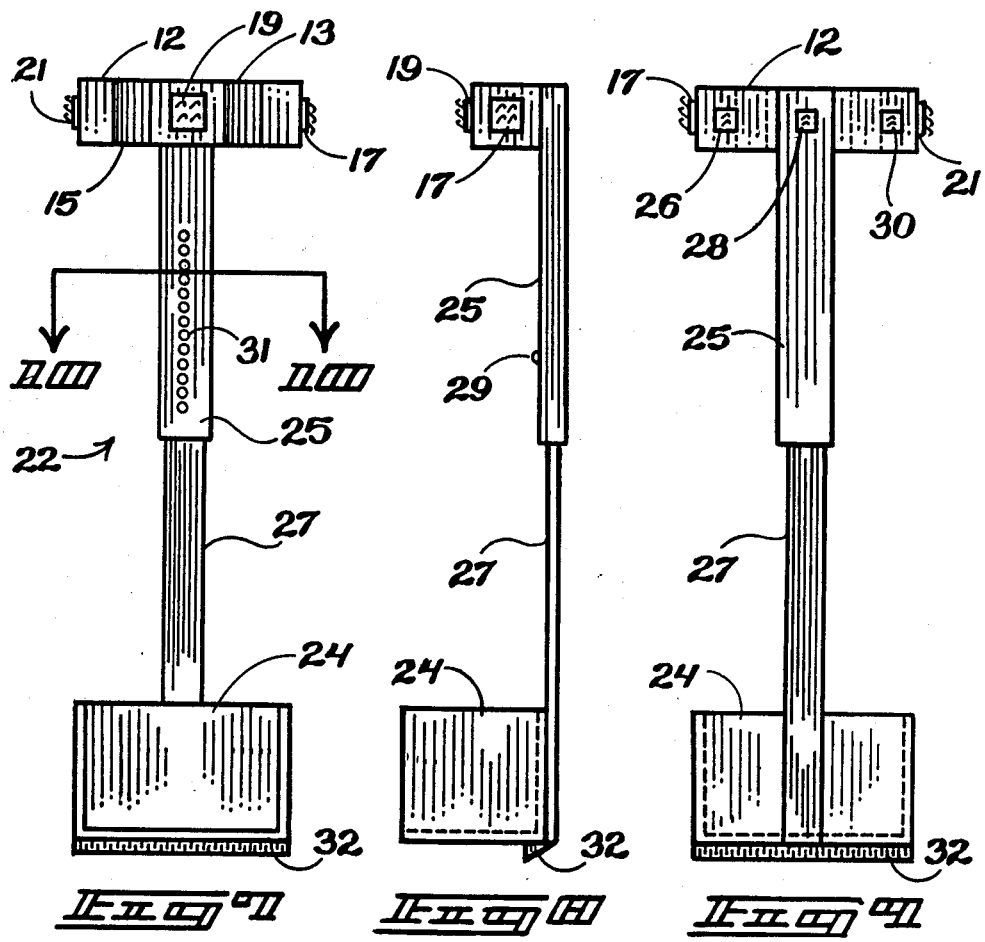
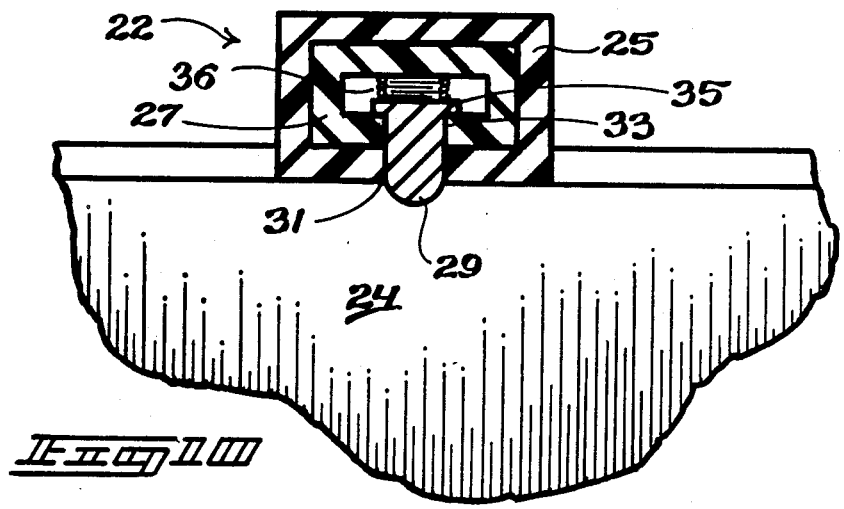

GUN RACK

BACKGROUND OF THE INVENTION

1. Field of the Invention

The present invention relates to gun racks, and more particularly pertains to a new and improved portable gun rack for use in vehicles. When individuals are hunting for game from a vehicle, it is necessary to store their rifles or shotguns in a safe, secure and easily accessible location. In order to overcome this problem, the present invention provides a portable gun rack adapted to be received in a space between the front bucket seats of a vehicle and having a barrel support block releasably secured to the vehicle dashboard. The gun rack of the present invention securely retains rifles or shotguns in a readily accessible location and allows free access to the floor mounted shift levers of the vehicle.

2. Description of the Prior Art

Various types of gun racks are known in the prior art. A typical example of such a gun rack is to be found in U.S. Pat. No. 2,668,645, which issued to P. Pease on Feb. 9, 1954. This patent discloses a locking gun holder secured to a vehicle dashboard for holding rifles or shotguns in an upright position. R. Johnson et al. U.S. Pat. No. 2,775,351, which issued on Dec. 25, 1956, discloses a gun rack adapted to be utilized on a bench type vehicle seat. The device utilizes a plurality of spaced supports provided with U-shaped notches. U.S. Pat. No. 2,919,058, which issued to W. Thompson on Dec. 29, 1959, discloses a gun mount for securing a rifle or shotgun within a vehicle interior. The device includes a resilient U-shaped clip for engagement with a gun barrel and a gun butt support cup for engagement with the gun butt. U.S. Pat. No. 3,477,586, which issued to L. Haluska on Nov. 11, 1969, discloses a portable gun rack adapted for use on a bench type vehicle seat. The device includes a pair of spaced parallel side rails having hooked top end portions adapted for engagement over the top edge of the vehicle seat back. A pair of transverse support members are mounted in parallel spaced relation on the side rails for support of rifles or shotguns. U.S. Pat. No. 3,746,177, which issued to D. Vilotti on July 17, 1973, discloses a portable magnetic rack for guns which includes a rectangular block provided with a plurality of U-shaped notches and having a magnetic back surface adapted for engagement with the metallic exterior surface of a vehicle.

While the above mentioned devices are suited for their intended usage, none of these devices disclose a portable gun rack adapted for use in vehicles having front bucket seats and providing ready access to rifles or shotguns while retaining sufficient clearance for operation of floor mounted vehicle shift levers. Additional features of the present invention, not disclosed by the aforesaid devices, is the provision of a gun support rack which utilizes a VELCRO fastening strap for retaining gun barrels in U-shaped notches of a barrel support block, and an adjustable length strut perpendicularly attached to the barrel support block and gun butt support box. Inasmuch as the art is relatively crowded with respect to these various types of gun racks, it can be appreciated that there is a continuing need for and interest in improvements to such gun racks, and in this respect, the present invention addresses this need and interest.

SUMMARY OF THE INVENTION

In view of the foregoing disadvantages inherent in the known types of gun racks now present in the prior art, the present invention provides an improved gun rack. As such, the general purpose of the present invention, which will be described subsequently in greater detail, is to provide a new and improved gun rack which has all the advantages of the prior art gun racks and none of the disadvantages.

To attain this, representative embodiments of the concepts of the present invention are illustrated in the drawings and make use of an elongated rectangular barrel support block perpendicularly attached at a top end of an elongated strut. The block has a plurality of U-shaped notches for the reception of gun barrels. A back side wall of the block has a VELCRO fastener for cooperation with a VELCRO fastener provided on the dashboard of the vehicle. A gun butt support box is perpendicularly attached at the lower end of the strut and is dimensioned to be received between the bucket seats and rest on the vehicle floor. A triangular rubber block may be provided on a bottom surface of the box. Gun barrels are retained in the U-shaped notches by a VELCRO fastened strap. The strut may be telescopically adjusted in length to adapt for use in different vehicles and with various different guns.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gun rack which has all the advantages of the prior art gun racks and none of the disadvantages.

It is another object of the present invention to provide a new and improved gun rack which may be easily and efficiently manufactured and marketed.

It is a further object of the present invention to provide a new and improved gun rack which is of a durable and reliable construction.

An even further object of the present invention is to provide a new and improved gun rack which is susceptible of a low cost of manufacture with regard to both materials and labor, and which accordingly is then susceptible of low prices of sale to the consuming public, thereby making such gun racks economically available to the buying public.

Still yet another object of the present invention is to provide a new and improved gun rack which provides in the apparatuses and methods of the prior art some of the advantages thereof, while simultaneously overcoming some of the disadvantages normally associated therewith.

Still another object of the present invention is to provide a new and improved gun rack which is adapted for use by road hunters and provides safe secure storage for rifles or shotguns, while allowing quick access.

Yet another object of the present invention is to provide a new and improved gun rack which is adapted to be releasably secured to a vehicle dashboard and supported between front bucket vehicle seats, for holding rifles or shotguns while allowing access to floor mounted vehicle shift levers.

Even still another object of the present invention is to provide a new and improved gun rack which is adjustable in length to adapt for sage with various different vehicles and guns.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the gun rack of the present invention mounted for use in a vehicle.

FIG. 2 is a front view of the gun rack of the present invention.

FIG. 3 is a side view of the gun rack of the present invention.

FIG. 4 is a back view of the gun rack of the present invention.

FIG. 5 is a top view of the gun rack of the present invention.

FIG. 6 illustrates the gun barrel VELCRO retaining strap of the gun rack of the present invention.

FIG. 7 is a front view of a modified form of gun rack according to the present invention.

FIG. 8 is a side view of the gun rack of FIG. 7.

FIG. 9 is a back view of the gun rack of FIG. 7.

FIG. 10 is an enlarged, partially cut away, cross sectional view taken along line 10—10 of FIG. 7, illustrating the telescopic adjustment mechanism of the gun rack of FIG. 7.

DESCRIPTION OF THE PREFERRED EMBODIMENT

With reference now to the drawings, and in particular to FIG. 1 thereof, a new and improved gun rack embodying the principles and concepts of the present invention and generally designated by the reference numeral 10 will be described.

More specifically, it will be noted that the first embodiment 10 of the invention includes an elongated barrel support block 12 having a front elongated side face provided with a pair of spaced U-shaped notches 13 and 15. A VELCRO fastened strap 14 is provided with spaced VELCRO fastening strips 16, 18 and 20 for cooperation with VELCRO fastening strips provided on opposite end faces of the block 12 and at a central portion 19 between the notches 13 and 15. An upper end of an elongated strut 22 is perpendicularly attached to the barrel support block 12. A gun barrel support box 24 having open front and top sides is perpendicularly attached to the lower end of the strut 22 and extends parallel to the block 12. The box 24 is dimensioned to be received between front bucket vehicle seats S. A VELCRO fastening strip is provided on a back side of the block 12 for cooperation with a VELCRO fastening strip adhesively secured to the vehicle dashboard D. In use, this provides support for rifles or shotguns which allows rapid access, while at the same time providing sufficient clearance for the operation of the transmission shift lever L and transfer case shift lever T.

As shown in FIG. 2, VELCRO fastening strips 17 and 21 are provided on opposite end faces of the barrel support block 12. Additional VELCRO fastening strip 19 is provided on a front side face of the block 12, between the notches 13 and 15. The VELCRO fastening strips 17, 19 and 21 are adapted for respective engagement with cooperating VELCRO fastening strips 16, 18 and 20 of the retaining strap 14 illustrated in FIG. 6. The gun butt support box 24 is in the form of a generally rectangular box having open top and front sides. The gun butt support box 24 and notches 13 and 15 are preferably lined with a soft felt material to prevent marring of the finish of stored rifles or shotguns.

FIG. 3 provides a side view of the gun support rack.

FIG. 4 provides a back view of the gun support rack which illustrates spaced VELCRO fastening strips 26, 28 and 30 adapted for engagement with cooperating VELCRO fastening strips adhesively secured to the dashboard of a vehicle.

FIG. 5 provides a top view of the gun rack of the present invention.

FIG. 6 illustrates the previously described VELCRO fastening strap 14 which is utilized to removably retain gun barrel portions of rifles or shotguns in the U-shaped notches 13 and 15 of the barrel support block 12.

FIG. 7 illustrates a slightly modified form of the gun rack of the present invention. The elongated strut 22 is formed by two hollow telescopically engaged members 25 and 27. The outer upper member 25 is provided with a plurality of longitudinally spaced apertures 31 for selective locking engagement with a retaining pin which is spring mounted within the member 27.

FIG. 8 provides a side view of the modified form of gun rack of FIG. 7 and illustrates the retaining pin 29 which extends transversely outwardly through one of the apertures 31 in the member 25. A triangular rubber block 32 may be provided on a bottom rear exterior floor of the gun butt support box 24. The rubber block 32 provides a non skid surface for engagement with the floor of the vehicle.

FIG. 9 provides a back view of the gun rack of FIG. 7.

FIG. 10 provides a transverse cross sectional view which illustrates the construction of the telescopically extendable strut 22. The outer member 25 has a hollow interior in which the inner member 27 is received for relative longitudinal sliding movement. A retaining pin 29 extends transversely through an aperture 33 provided in a front side wall of the inner member 27. A flange 35 on the pin 29 retains the pin 29 within the interior of the member 27. A coil spring 36 is provided which biases the retaining pin 29 outwardly. As illustrated, the retaining pin 29 is adapted to be received through one of the spaced apertures 31 formed through the member 25. When in the illustrated locked condition, the retaining pin 29 locks the members 25 and 27 against relative sliding movement. When it is desired to adjust the length of the strut 22, the retaining pin 29 is manually depressed inwardly against the bias of the spring 36 and out of engagement with the aperture 31 in the outer member 25. This allows relative sliding movement of the members 25 and 27. The adjustability of the strut 22 allows the modified form of gun rack to be adapted for use with various different lengths of rifles and shotguns and also allows adjustment for use with various different vehicles.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable gun rack for holding rifles and shotguns and an interior of a vehicle having front bucket seats, a dashboard and a floor, comprising:
   an elongated barrel support block;
   at least one notch for receiving a gun barrel in said block;
   strap fastening means on said block for securing a gun barrel in said notch;
   releasable securing means on said block for securing said block to the vehicle dashboard;
   an elongated strut having an upper end perpendicularly attached to said block; and
   an elongated gun butt support box extending parallel to said block and perpendicularly attached to a lower end of said strut, said box dimensioned to be received between the vehicle front bucket seats and rest on the vehicle floor.

2. The gun rack of claim 1, wherein said strap fastening means comprises:
   first VELCRO fastening means on opposite end faces and on a central portion of a first side face of said block; and
   an elongated strap having second VELCRO fastening means at opposite ends and at a central portion for cooperation with said first VELCRO fastening means for securing said strap across said notch.

3. The gun rack of claim 1, wherein said releasable securing means comprises cooperating VELCRO fastening means on said block and on the vehicle dashboard.

4. The gun rack of claim 1, further comprising means for adjusting the length of said strut.

5. The gun rack of claim 4, wherein said elongated strut comprises a pair of telescopically engaged members.

6. The gun rack of claim 5, further comprising: a first hollow member having an aperture receiving a transversely movable retaining pin; spring means outwardly biasing said retaining pin; said first member telescopically received for relative longitudinal sliding movement within a second hollow member; and
   said second member having a plurality of spaced holes for selective engagement with said retaining pin.

7. The gun rack of claim 1, further comprising a triangular rubber block on a rear floor portion of said gun butt support box for engagement with the vehicle floor.

8. A portable gun rack for holding rifles and shotguns and an interior of a vehicle having front bucket seats, a dashboard and a floor, comprising:
   an elongated rectangular barrel support block;
   at least one U-shaped notch in a first elongated side face of said block;
   first VELCRO fastening means on opposite end faces and on a central portion of said first side face of said block;
   an elongated strap having second VELCRO fastening means at opposite end and at a central portion for cooperation with said first VELCRO fastening means for securing said strap means across said U-shaped notch;
   third VELCRO fastening means on a second elongated side face of said block, opposite said first side face, for releasably securing said block to cooperating fourth VELCRO fastening means on the dashboard of the vehicle;
   an elongated strut, an upper end of said strut perpendicularly attached at a central portion of said block;
   an elongated rectangular gun butt support box having opposed end faces connected by a floor and an elongated back side wall, said box having an open front side and an open top extending parallel with said barrel support block and perpendicularly attached to a lower end of said strut; and
   said box dimensioned to be received between the vehicle front bucket seats and rest on the vehicle floor.

9. The gun rack of claim 8, further comprising means for adjusting the length of said strut.

10. The gun rack of claim 9, wherein said elongated strut comprises a pair of telescopically engaged members.

11. The gun rack of claim 10, further comprising:
a first hollow member having an aperture receiving a transversely movable retaining pin;
spring means outwardly biasing said retaining pin;
said first member telescopically received for relative longitudinal sliding movement within a second hollow member; and
said second member having a plurality of spaced holes for selective engagement with said retaining pin.

12. The gun rack of claim 9, further comprising a triangular rubber block on a rear floor portion of said gun butt support box for engagement with the vehicle floor.

* * * * *